United States Patent
Bhattacharya et al.

(10) Patent No.: US 11,595,471 B1
(45) Date of Patent: Feb. 28, 2023

(54) METHOD AND SYSTEM FOR ELECTING A MASTER IN A CLOUD BASED DISTRIBUTED SYSTEM USING A SERVERLESS FRAMEWORK

(71) Applicant: Intuit Inc., Mountain View, CA (US)

(72) Inventors: Soubhik Bhattacharya, Bangalore (IN); Sukhesh M. Gopala, Bangalore (IN); Pawan Gupta, Bangalore (IN)

(73) Assignee: Intuit Inc., Mountain View, CA (US)

( * ) Notice: Subject to any disclaimer, the term of this patent is extended or adjusted under 35 U.S.C. 154(b) by 1251 days.

(21) Appl. No.: 16/047,751

(22) Filed: Jul. 27, 2018

(51) Int. Cl.
| | |
|---|---|
| G06F 15/173 | (2006.01) |
| H04L 67/1029 | (2022.01) |
| G06F 9/50 | (2006.01) |
| G06F 11/34 | (2006.01) |
| H04L 67/1031 | (2022.01) |

(52) U.S. Cl.
CPC ......... *H04L 67/1029* (2013.01); *G06F 9/505* (2013.01); *G06F 9/5083* (2013.01); *G06F 11/3433* (2013.01); *H04L 67/1031* (2013.01)

(58) Field of Classification Search
CPC ... H04L 67/1029; G06F 9/505; G06F 9/5083; G06F 11/3433
USPC ............................... 709/238, 223, 224, 220
See application file for complete search history.

(56) References Cited

U.S. PATENT DOCUMENTS

2018/0139305 A1* 5/2018 Thibeault ............ H04L 67/1004
2019/0347352 A1* 11/2019 Gochkov ............ H04L 67/1034

* cited by examiner

*Primary Examiner* — Lan Dai T Truong
(74) *Attorney, Agent, or Firm* — Paradice & Li LLP

(57) ABSTRACT

A method and system elects a master node from a plurality of nodes in a distributed system. A serverless elector function periodically outputs an election API call to a load balancer. The load balancer elects a master node from a plurality of candidate nodes each time the load balancer receives the election API call.

32 Claims, 4 Drawing Sheets

METHOD AND SYSTEM FOR ELECTING A MASTER IN A CLOUD BASED DISTRIBUTED SYSTEM USING A SERVERLESS FRAMEWORK

BACKGROUND

Many data management systems utilize cloud-based distributed systems to manage communication with the data management systems, or between subsystems of the data management systems. Distributed systems typically include one or more nodes that serve as communication links between the distributed systems and other systems external to the distributed systems. Each node can correspond to an individual server, virtual machine, or a process running in a server or virtual machine.

In a distributed system, sometimes it is desirable to ensure that a piece of software code is executed by no more than one concurrent node or process. The node or process that executes this critical code is known as the master node or master process. One example of such critical code is one that decides whether to open (i.e. break) the circuit between the nodes of an external system and the nodes of the distributed system in response to a high rate of failures connecting with the nodes of the external system.

Failing to decide on a single master node can lead to a condition known as split-brain. In the split-brain condition, multiple nodes or processes function as masters and take actions that may be inconsistent with each other. For example, one master may attempt to open a circuit while the other may attempt to close (i.e. complete) the circuit.

Some traditional data management systems seek to achieve a single master design by simply using a single node and designating it as the master. However, this approach suffers from the drawback that this node becomes a single point of failure. If this node is down, there is no master.

Other traditional data management systems utilize a distributed co-ordination service such as Zookeeper to help elect a master using a leader election technique. However, Zookeeper is a highly complex system requiring at least 3 nodes. This can be very resource intensive and may not be affordable in many smaller use-cases.

Still other traditional data management systems utilize a global lock to ensure critical code is executed by only one node at a time. However, this can require implementation of a distributed co-ordination service, like Zookeeper, to implement a global lock. The result is a costly and complex system.

When the data management systems, or other systems utilizing distributed nodes, are unable, or cannot afford, to implement a single master system, the data management system, it's users, and partners can suffer negative consequences. In some cases, the mismanagement of communication nodes and channels can result in an entire failure of systems or processes associated with the data management system. Furthermore, implementation of current single master solutions can result in inefficient use of system resources.

What is needed is a method and system that provide a technical solution to the technical problem of providing a single master system that is reliable, efficient, inexpensive, and scalable.

SUMMARY

Embodiments of the present disclosure provide one or more technical solutions to the technical problem of providing a single master system that is reliable, efficient, inexpensive, and scalable. Embodiments of the present disclosure include a distributed system that includes multiple distributed nodes. Embodiments of the present disclosure monitor and manage the nodes with a load balancer. Embodiments of the present disclosure utilize a cloud-based serverless elector function to periodically make elector calls to the load balancer with a selected periodicity. Each time the load balancer receives the elector call from the serverless elector function, the load balancer elects one of the nodes to be the master node for a period defined by the selected periodicity. In this way, the serverless elector function ensures that a master node is periodically elected.

Embodiments of the present disclosure address some of the shortcomings associated with traditional cloud-based distributed systems. A master node is elected with a selected periodicity in an efficient manner. The various embodiments of the disclosure can be implemented to improve the technical fields of cloud computing, data processing, and data transmission. Therefore, the various described embodiments of the disclosure and their associated benefits amount to significantly more than an abstract idea. In particular, by providing extendable automatic base patterns, software development and deployment is significantly improved.

Figure 1:
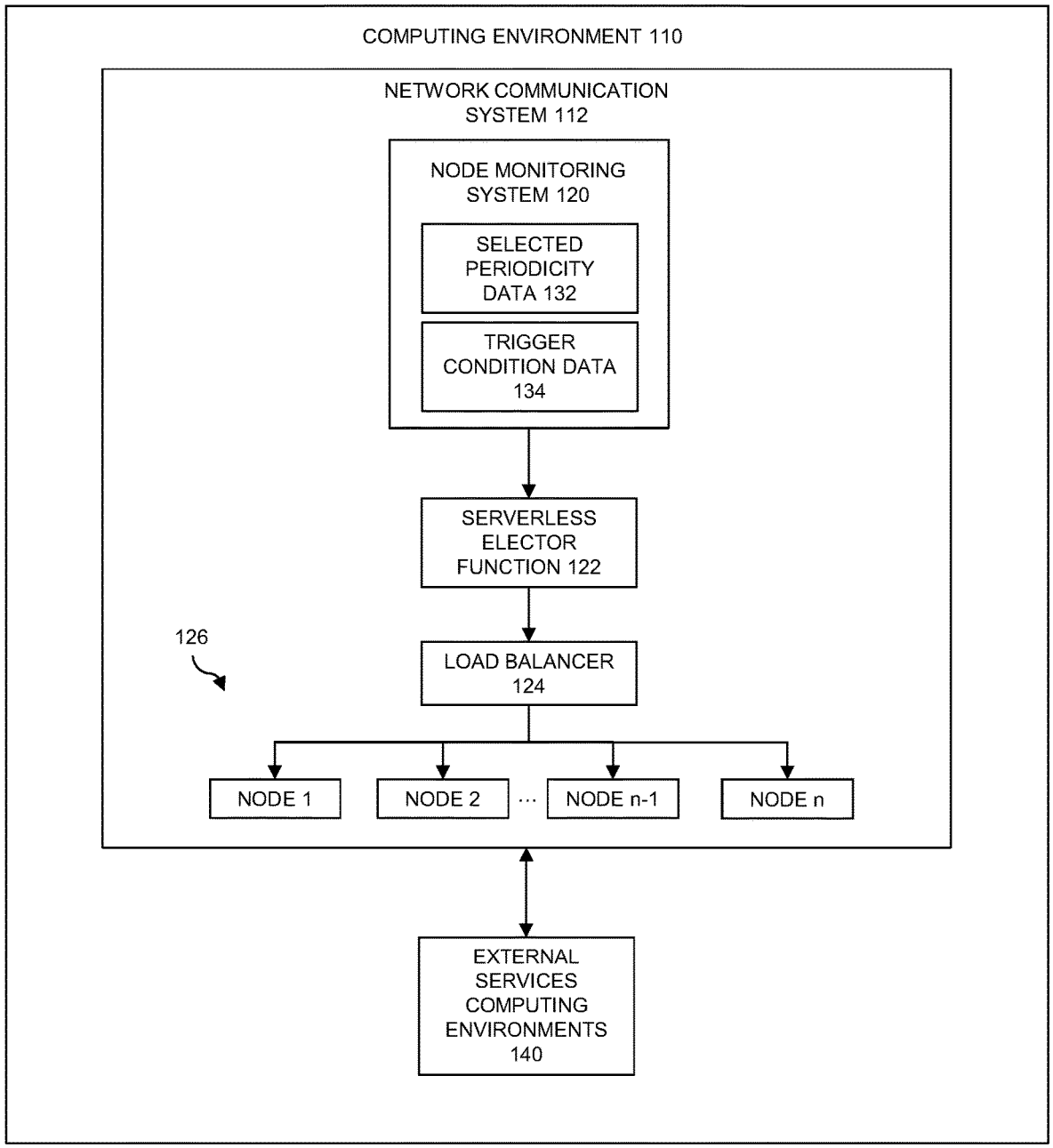
FIG. 1 is a block diagram of a system for efficiently electing a master node from a plurality of candidate nodes, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

FIG. 1 illustrates a block diagram of a production environment 100 for efficiently electing a master node from a plurality of candidate nodes, according to one embodiment. Embodiments of the present disclosure operate a plurality of nodes in a distributed system. Embodiments of the present disclosure manage the plurality of nodes with a load balancer. Embodiments of the present disclosure utilize a serverless elector function to cooperate with the load balancer to periodically elect a master node from a plurality of candidate nodes. The serverless elector function outputs an election application programming interface (API) call to the load balancer with a selected periodicity. The load balancer elects a new master node each time the load balancer receives the election API call from the serverless elector function.

In one embodiment, a cloud environment provides a serverless framework. This framework can execute a serverless function following a cron-like schedule. Such a function can choose a master node by calling a simple representational state transfer (REST) API. The REST API call is forwarded to a node by a load balancer. The node selected by the load balancer can remain the master node for a certain period of time before the next call is made by the serverless function.

In one embodiment, a cluster of nodes is designated as candidate master nodes. Each candidate node hosts a service and REST endpoint. The cluster is fronted by a load balancer such as an elastic load balancer. The load balancer forwards an incoming request to exactly one of the candidate nodes. The load balancer chooses the node based on certain routing policy, such as a round robin, or an algorithm-based policy. The load balancer periodically checks the health of each candidate node and ensures that requests are forwarded to only a healthy node. This enables a distributed system to elect a master node with scalability and high availability.

In one embodiment, a serverless elector function is defined, such as an Amazon Web Services (AWS) Lambda function. The serverless elector function calls the election API on the load balancer.

In one embodiment, a schedule is defined, such as an AWS CloudWatch schedule. The schedule is attached to the serverless elector function. This ensures that the function is executed as per a fixed schedule, such as every minute.

In one embodiment, when the serverless elector function calls the elect API, the load balancer forwards the call to one of the healthy candidate nodes. This node becomes a master for a predefined interval, as defined by the schedule of the elector. For example, if the elector runs every minute, then this node remains a master for roughly a minute and relinquishes master status voluntarily after that.

In one embodiment, if one of the candidate nodes is down, the load balancer forwards the election API calls to one of the healthy nodes, thus achieving high availability, flexibility, and reliability.

In one embodiment, if the most recently elected master node is down, the cluster of nodes remains without a master until another node is elected as the new master. The next master can be elected when the elector function is invoked next, as per the regular schedule, if the interval between successive invocations is deemed small enough. In one embodiment, the elector function is invoked when a "candidate node down" event occurs, so that the master is elected sooner.

The disclosed method and system for efficiently electing a master node from a plurality of candidate nodes provides for significant improvements to the technical fields of data communication, data transmission, network system efficiency, data processing, and data management.

The disclosed method and system for efficiently electing a master node from a plurality of candidate nodes provides for the processing and storing of smaller amounts of data related to node elector systems: i.e., fewer systems are needed and less effective measures can be discarded; thereby eliminating unnecessary data analysis and storage. Consequently, using the disclosed method and system for efficiently electing a master node from a plurality of candidate nodes results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for efficiently electing a master node from a plurality of candidate nodes.

The production environment 100 includes a computing environment 110. The computing environment 110 represents one or more computing systems such as a server, and/or distribution center that is configured to receive, execute, and host one or more data storage and access systems, according to one embodiment. The computing environment 110 represents a traditional data center computing environment, a virtual asset computing environment (e.g., a cloud computing environment), or a hybrid between a traditional data center computing environment and a virtual asset computing environment, according to one embodiment.

In one embodiment, the computing environment 110 includes a network communication system 112. The network communication system 112 includes a node monitoring system 120, a serverless elector function 122, a load balancer 124, and a plurality of nodes 126, according to various embodiments.

In one embodiment, the network communication system 112 is a system that facilitates connection between itself and other systems or services. The network communication system 112 can be part of a web-based system that provides services to users of the system. For example, the network communication system 112 can be part of a data management system that provides data management services to users. In this case the network communication system 112 can be a system that directly connects users of the data management system to the data management system. Alternatively, the network communication system 112 can be part of a sub service provided by the data management system. The network communication system 112 can connect to other subsystems of the data management system, or to a system, service or network, external to the data management system.

In one embodiment, the nodes 126 provide the communication links between the network communication system 112 and systems, services, networks, or devices external to the network communication system 112. In one example in which the network communication system 112 is part of a web-based data management system, the nodes 126 can correspond to the communication links to which users of the data management system connect in order to receive data management services from the data management system. A user of the data management system that attempts to log into the data management system will connect to one of the nodes 126 in order to receive data management services from the data management system.

In one embodiment, continuing with the example in which the network communication system 112 is part of a data management system, the nodes 126 can correspond to communication nodes that enable a service or subsystem of the data management system to connect to another service or subsystem of the data management system. The nodes 126 may make application programming interface (API) calls to nodes on another system external to the network communication system 112 in order to establish the communication link between the network communication system 112 and the external system.

In one embodiment, each node 126 corresponds to a physical server. External computing environments that wish to access services associated with the network communication system 112 connect to a server corresponding to one of the nodes 126. Once a communication link is established with one of the servers, communication can occur between the network communication system 112 and an external computing environment.

In one embodiment, each node 126 corresponds to a virtual machine. External computing environments that wish to access services associated with the network communication system 112 connect to a virtual machine corresponding to one of the nodes 126. Once a communication link is established with one of the virtual machines, communication can occur between the network communication system 112 and an external computing environment.

In one embodiment, each node 126 corresponds to a process within a physical computing device. External computing environments that wish to access services associated with the network communication system 112 connect to a process within the physical computing device corresponding to one of the nodes 126. Once a communication link is established with one of the processes within a physical computing device, communication can occur between the network communication system 112 and an external computing environment.

In one embodiment, the network communication system 112 utilizes a load balancer 124 in order to balance the load between the nodes 126. The load balancer 124 helps to balance traffic through the nodes 126. If one node is experiencing relatively heavy traffic while another node is experiencing relatively light traffic, the load balancer 124 can direct new incoming or outgoing communication through the node experiencing relatively light traffic.

In one embodiment, the load balancer 124 checks the health of the nodes 126. The load balancer 124 periodically makes health check API calls to each of the nodes 126 in order to determine the health of the nodes. Each node responds to the health check API calls. In this way, the load balancer 124 determines the health, i.e. the current functionality, of each of the nodes 126.

In one embodiment, the load balancer 124 only distributes communication traffic among the healthy nodes. If a node 126 becomes unhealthy, then the load balancer 124 will cease to direct traffic through that node. In this way, the load balancer 124 ensures that nodes that are broken will not be used as communication links between the network communication system 112 and any external systems or processes.

In one embodiment, the nodes 126 also determine the health of nodes associated with external systems or services. The nodes can periodically make API calls to nodes associated with external systems or services in order to determine if those nodes are healthy and available. The load balancer 124, or other aspects of the network communication system 112 will cause the nodes 126 to only make API calls to external nodes that are healthy or otherwise available.

In some cases, problems can arise if multiple nodes 126 are independently ascertaining the health or availability of external nodes. For example, in one embodiment, the nodes 126 determine the health of external nodes by determining the percentage of API calls that were successfully received by the external nodes. However, because the nodes 126 do not operate on a single clock or timing pattern, the testing periods will not align if multiple nodes 126 were to independently determine the health of external nodes. Based on their disparate testing periods, some nodes 126 could determine that an external node is healthy, while other nodes could determine that the external node is not healthy. This can result in communication problems between the network communication system 112 and the external system or service associated with the external nodes.

In order to avoid this problem, some traditional communication systems have designated a particular node to be a master node. The master node determines whether external nodes are healthy. The non-master nodes of the traditional communication systems do not determine the health of external nodes.

However, traditional communication systems elect a master node in ways that result in additional problems to the traditional communication systems. For example, some traditional communication systems elect a master node and then do not change the master node. If the master node becomes unhealthy or otherwise becomes broken, then the traditional communication systems are effectively left without a master node. In other cases, traditional communication systems elect a master node in complicated and resource intensive ways.

In one embodiment, the network communication system 112 overcomes some of the drawbacks of traditional communication systems by periodically electing a new master node in a simple and efficient process. If the master node becomes broken or unhealthy, the network communication system 112 is only affected for a relatively short period of time because the network communication system 112 automatically elects a new master node in accordance with a selected periodicity. In this way, the network communication system 112 ensures that a new master node is elected periodically.

In one embodiment, the network communication system 112 utilizes the node monitoring system 120 and the serverless elector function 122 in order to periodically elect a new master node. In particular, the node monitoring system 120 periodically issues a trigger signal including trigger data to the serverless elector function 122. When the serverless elector function receives the trigger signal from the node monitoring system 120, the trigger signal makes an API call to the load balancer 124 indicating that the load balancer 124 should elect a new master node. The load balancer 124 then elects a new master node from the nodes 126 responsive to the API calls from the serverless elector function 122.

In one embodiment, when the load balancer 124 receives the API call from the serverless elector function 122, the load balancer 124 elects a master node only from those nodes that are currently determined to be healthy. As set forth previously, the load balancer 124 continuously monitors the health of the nodes 126. When the load balancer 124 receives the election API call from the serverless elector function 122, the load balancer 124 elects a master node only from those nodes 126 that are determined by the load balancer 124 to be healthy.

In one embodiment, the node monitoring system 120 stores selected periodicity data 132. The selected periodicity data 132 identifies a periodicity or frequency with which the serverless elector function 122 should call for election of a new master node. The node monitoring system 120 periodically outputs the trigger signal to the serverless elector function 122 in accordance with the selected periodicity data 132.

In one embodiment, the selected periodicity data 132 can define a period of less than one hour. For example, the selected periodicity data 132 may define a 30-minute period. At the end of each 30-minute period, the node monitoring system 120 outputs a trigger signal to the serverless elector function 122, causing the serverless elector function 122 to make an API call to the load balancer 124 in order to cause the load balancer 124 to elect a new master node.

In one embodiment, the selected periodicity data 132 can define a period of less than one minute. For example, the selected periodicity data 132 may define a 30 second period. At the end of each 30 second period, the node monitoring system 120 outputs a trigger signal to the serverless elector function 122, causing the serverless elector function 122 to make an election API call to the load balancer 124 in order to cause the load balancer 124 to elect a new master node.

In one embodiment, the node monitoring system 120 can include trigger condition data 134. The trigger condition data 134 indicates other conditions of the nodes 126 that will result in generation of a trigger signal by the node monitoring system 120. For example, if the node monitoring system 120 detects or learns that the current master node 126 is broken or unhealthy, the node monitoring system 120 will generate a trigger signal. The serverless elector function 122 will, in turn, output an election API call to the load balancer 124 responsive to the trigger signal generated by the node monitoring system 120.

In one embodiment, the node monitoring system 120 receives health data about the nodes 126 from the load balancer 124. Alternatively, the node monitoring system 120 can receive health data about the nodes 126 by monitoring the nodes 126 independently from the load balancer 124.

In one embodiment, the serverless elector function 122 is a function, process, or module implemented in accordance with a cloud computing architecture platform. The serverless elector function 122 corresponds to a cloud computing code execution model in which the cloud platform provider manages starting and stopping of the serverless elector function's container platform to serve API calls to the load balancer 124. Because the serverless elector function 122 is serverless, the serverless elector function can periodically make API calls, such as calling for the election of a master node.

In one embodiment, the network communication system 112 utilizes the Amazon Web Services (AWS) cloud computing infrastructure. In this case, the serverless elector function 122 can be a Lambda function. Each time the lambda function is triggered by the node monitoring system 120, the Lambda function makes an election API call to the load balancer 124 calling for the load balancer 124 to elect a new master node.

In one embodiment, the network communication system utilizes a cloud computing infrastructure other than AWS. For example, the network communication system 112 can utilize Google Cloud, Microsoft Azure, or another cloud computing architecture. The network communication system 112 can utilize a serverless function provided by the cloud computing infrastructure incorporated by the network communication system 112.

In one embodiment, the master node gives up its master status voluntarily at the end of the period defined by the selected periodicity data 132. Thus, if the selected periodicity data 132 defines a period of 30 seconds, then each time a master node is elected, that master node voluntarily or automatically gives up master status after 30 seconds. Thus, when the load balancer 124 elects a master node, the master node is elected for a period of time defined by the selected periodicity data 132.

In one embodiment, the master node is able to determine whether a circuit between one of the nodes 126 and an external node should be broken or closed. In other words, the master node can determine to break the connection between one of the nodes 126 and an external node. The master node 126 can also determine whether to complete or close the connection between one of the nodes 126 and an external node.

In one embodiment, the load balancer 124 is configured to call a health API on each candidate node with a selected periodicity, for example, every 10 seconds. In this way, the load balancer 124 continuously monitors the health of the nodes 126. Periods other than 10 s can be used.

In one embodiment, the load balancer 124 is an elastic load balancer. The elastic load balancer 124 automatically scales its request handling capacity in response to incoming application traffic. Thus, the elastic load balancer 124 calls up or releases additional nodes based on the demands of current traffic with the network communication system 112. In this case, the load balancer 124 will choose a master from the nodes 126 currently called into operation by the load balancer 124 for operation with the network communication system 112.

In one embodiment, the nodes 126 of the network communication system connect to nodes of the external services computing environments 140. The external services computing environments 140 can include systems that are external to the network communication system 112. The external services computing environments can include computing environments that are part of the same overall system as the network communication system. For example, the network communication system and the external services computing environments may represent separate subsystems of the same data management system. Alternatively, the external services computing environments 140 can represent computing environments external to the overall data management system of which the network communication system 112 is a part.

Embodiments of the present disclosure address some of the shortcomings associated with traditional cloud-based distributed systems. A master node is elected with a selected periodicity in an efficient manner. The various embodiments of the disclosure can be implemented to improve the technical fields of cloud computing, data processing, and data transmission. Therefore, the various described embodiments of the disclosure and their associated benefits amount to significantly more than an abstract idea. In particular, by providing extendable automatic base patterns, software development and deployment is significantly improved.

Figure 2:
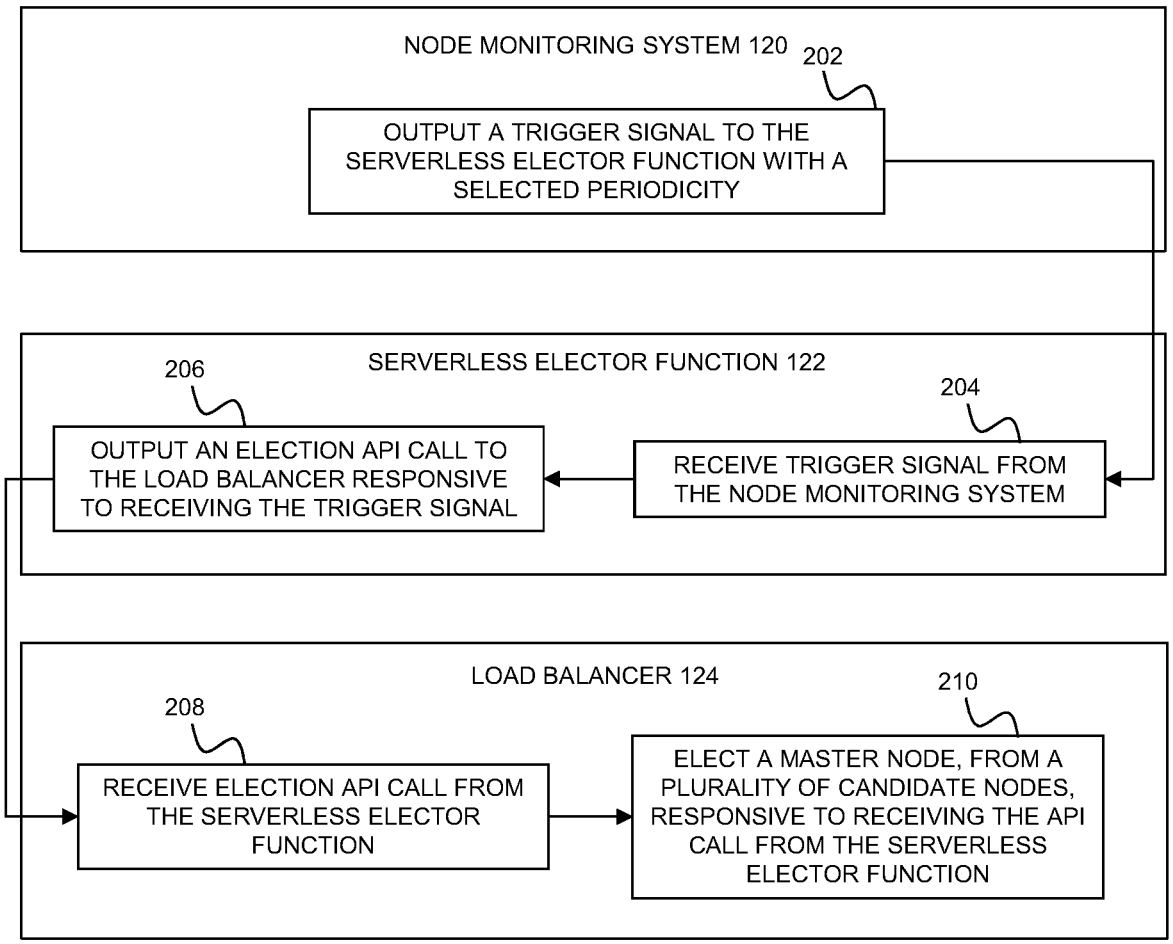
FIG. 2 is a block diagram of a process for efficiently electing a master node from a plurality of candidate nodes, in accordance with one embodiment.

FIG. 2 illustrates a functional flow diagram of a process 200 for efficiently electing a master node from a plurality of candidate nodes, in accordance with one embodiment.

Referring to FIG. 2, FIG. 1, and the description of FIG. 1 above, at block 202 the node monitoring system 120 outputs a trigger signal to the serverless elector function 122 with a selected periodicity using any of the methods, processes, and procedures discussed above with respect to FIG. 1, according to one embodiment. From block 202 the process proceeds to block 204.

At block 204 the serverless elector function 122 receives the trigger signal from the node monitoring system 120, using any of the methods, processes, and procedures discussed above with respect to FIG. 1, according to one embodiment. From block 204 the process proceeds to block 206.

At block 206 the serverless elector function 122 outputs an election API call to the load balancer responsive to receiving the trigger signal, using any of the methods, processes, and procedures discussed above with respect to FIG. 1, according to one embodiment. From block 206 the process proceeds to block 208.

At block 208, the load balancer 124 receives the election API call from the serverless elector function 122, using any of the methods, processes, and procedures discussed above with respect to FIG. 1, according to one embodiment. From block 208 the process proceeds to block 210.

At block 210, the load balancer 124 elects a master node from a plurality of candidate nodes responsive to receiving the API call from the serverless elector function, using any of the methods, processes, and procedures discussed above with respect to FIG. 1, according to one embodiment.

Those of skill in the art will recognize, in light of the present disclosure, that the process 200 can include different steps and different orders of steps, other than those represented in FIG. 2. All such other processes fall within the scope of the present disclosure.

Figure 3:
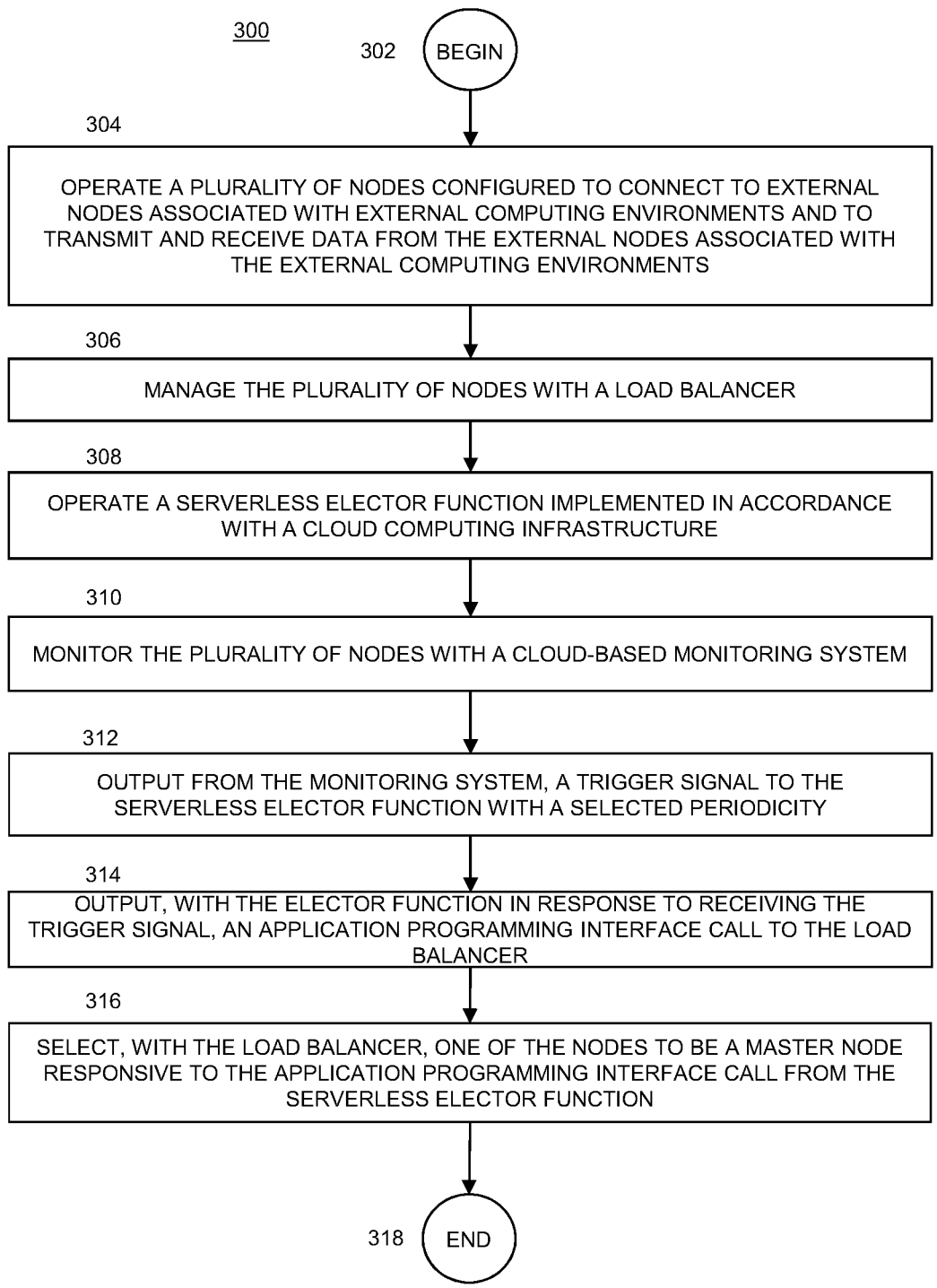
FIG. 3 is a flow diagram of a process for efficiently electing a master node from a plurality of candidate nodes, in accordance with one embodiment.

FIG. 3 illustrates a flow diagram of a process 300 for efficiently electing a master node from a plurality of candidate nodes, according to various embodiments.

Referring to FIGS. 1-3, and the description of FIGS. 1-2 above, in one embodiment, process 300 begins at BEGIN 302 and process flow proceeds to OPERATE A PLURALITY OF NODES CONFIGURED TO CONNECT TO EXTERNAL NODES ASSOCIATED WITH EXTERNAL COMPUTING ENVIRONMENTS AND TO TRANSMIT AND RECEIVE DATA FROM THE EXTERNAL NODES ASSOCIATED WITH THE EXTERNAL COMPUTING ENVIRONMENTS 304.

In one embodiment, at OPERATE A PLURALITY OF NODES CONFIGURED TO CONNECT TO EXTERNAL NODES ASSOCIATED WITH EXTERNAL COMPUTING ENVIRONMENTS AND TO TRANSMIT AND RECEIVE DATA FROM THE EXTERNAL NODES ASSOCIATED WITH THE EXTERNAL COMPUTING ENVIRONMENTS 304, a plurality of nodes configured to connect to external nodes associated with external computing environments and to transmit and receive data from the external nodes associated with the external computing environments is operated, using any of the methods, processes, and procedures discussed above with respect to FIGS. 1-2.

In one embodiment, once a plurality of nodes configured to connect to external nodes associated with external computing environments and to transmit and receive data from the external nodes associated with the external computing environments is operated at OPERATE A PLURALITY OF NODES CONFIGURED TO CONNECT TO EXTERNAL NODES ASSOCIATED WITH EXTERNAL COMPUTING ENVIRONMENTS AND TO TRANSMIT AND RECEIVE DATA FROM THE EXTERNAL NODES ASSOCIATED WITH THE EXTERNAL COMPUTING ENVIRONMENTS 304 process flow proceeds to MANAGE THE PLURALITY OF NODES WITH A LOAD BALANCER 306.

In one embodiment, at MANAGE THE PLURALITY OF NODES WITH A LOAD BALANCER 306, the plurality of nodes is managed with a load balancer, using any of the methods, processes, and procedures discussed above with respect to FIGS. 1-2.

In one embodiment, once the plurality of nodes is managed with a load balancer at MANAGE THE PLURALITY OF NODES WITH A LOAD BALANCER 306, process flow proceeds to OPERATE A SERVERLESS ELECTOR FUNCTION IMPLEMENTED IN ACCORDANCE WITH A CLOUD COMPUTING INFRASTRUCTURE 308.

In one embodiment, at OPERATE A SERVERLESS ELECTOR FUNCTION IMPLEMENTED IN ACCORDANCE WITH A CLOUD COMPUTING INFRASTRUCTURE 308, a serverless elector function implemented in accordance with a cloud computing infrastructure is operated, using any of the methods, processes, and procedures discussed above with respect to FIGS. 1-2.

In one embodiment, once a serverless elector function implemented in accordance with a cloud computing infrastructure is operated at OPERATE A SERVERLESS ELECTOR FUNCTION IMPLEMENTED IN ACCORDANCE WITH A CLOUD COMPUTING INFRASTRUCTURE 308, process flow proceeds to MONITOR THE PLURALITY OF NODES WITH A CLOUD-BASED MONITORING SYSTEM 310.

In one embodiment, at MONITOR THE PLURALITY OF NODES WITH A CLOUD-BASED MONITORING SYSTEM 310, the plurality of nodes is monitored with a cloud-based monitoring system, using any of the methods, processes, and procedures discussed above with respect to FIGS. 1-2.

In one embodiment, once the plurality of nodes is monitored with a cloud-based monitoring system at MONITOR THE PLURALITY OF NODES WITH A CLOUD-BASED MONITORING SYSTEM 310, process flow proceeds to OUTPUT FROM THE MONITORING SYSTEM, A TRIGGER SIGNAL TO THE SERVERLESS ELECTOR FUNCTION WITH A SELECTED PERIODICITY 312.

In one embodiment, at OUTPUT FROM THE MONITORING SYSTEM, A TRIGGER SIGNAL TO THE SERVERLESS ELECTOR FUNCTION WITH A SELECTED PERIODICITY 312, a trigger signal is output from the monitoring system to the serverless elector function with a selected periodicity, using any of the methods, processes, and procedures discussed above with respect to FIGS. 1-2.

In one embodiment, once a trigger signal is output from the monitoring system to the serverless elector function with a selected periodicity at OUTPUT FROM THE MONITORING SYSTEM, A TRIGGER SIGNAL TO THE SERVERLESS ELECTOR FUNCTION WITH A SELECTED PERIODICITY 312, process flow proceeds to OUTPUT, WITH THE ELECTOR FUNCTION IN RESPONSE TO RECEIVING THE TRIGGER SIGNAL, AN APPLICATION PROGRAMMING INTERFACE CALL TO THE LOAD BALANCER 314, an application programming interface call to the load balancer is output with the elector function in response to receiving the trigger signal, using any of the methods, processes, and procedures discussed above with respect to FIGS. 1-2.

In one embodiment, once an application programming interface call to the load balancer is output with the elector function in response to receiving the trigger signal at OUTPUT, WITH THE ELECTOR FUNCTION IN RESPONSE TO RECEIVING THE TRIGGER SIGNAL, AN APPLICATION PROGRAMMING INTERFACE CALL TO THE LOAD BALANCER 314, process flow proceeds to SELECT, WITH THE LOAD BALANCER, ONE OF THE NODES TO BE A MASTER NODE RESPONSIVE TO THE APPLICATION PROGRAMMING INTERFACE CALL FROM THE SERVERLESS ELECTOR FUNCTION 316.

In one embodiment, at SELECT, WITH THE LOAD BALANCER, ONE OF THE NODES TO BE A MASTER NODE RESPONSIVE TO THE APPLICATION PROGRAMMING INTERFACE CALL FROM THE SERVERLESS ELECTOR FUNCTION 316, one of the nodes is selected, with the load balancer, to be a master node responsive to the application programming interface call from the serverless elector function, using any of the methods, processes, and procedures discussed above with respect to FIGS. 1-2.

In one embodiment, once one of the nodes is selected, with the load balancer, to be a master node responsive to the application programming interface call from the serverless elector function at SELECT, WITH THE LOAD BALANCER, ONE OF THE NODES TO BE A MASTER NODE RESPONSIVE TO THE APPLICATION PROGRAMMING INTERFACE CALL FROM THE SERVERLESS ELECTOR FUNCTION 316, process flow proceeds to END 318.

In one embodiment, at END 318 the process for efficiently electing a master node from a plurality of candidate nodes is exited to await new data and/or instructions.

Figure 4:
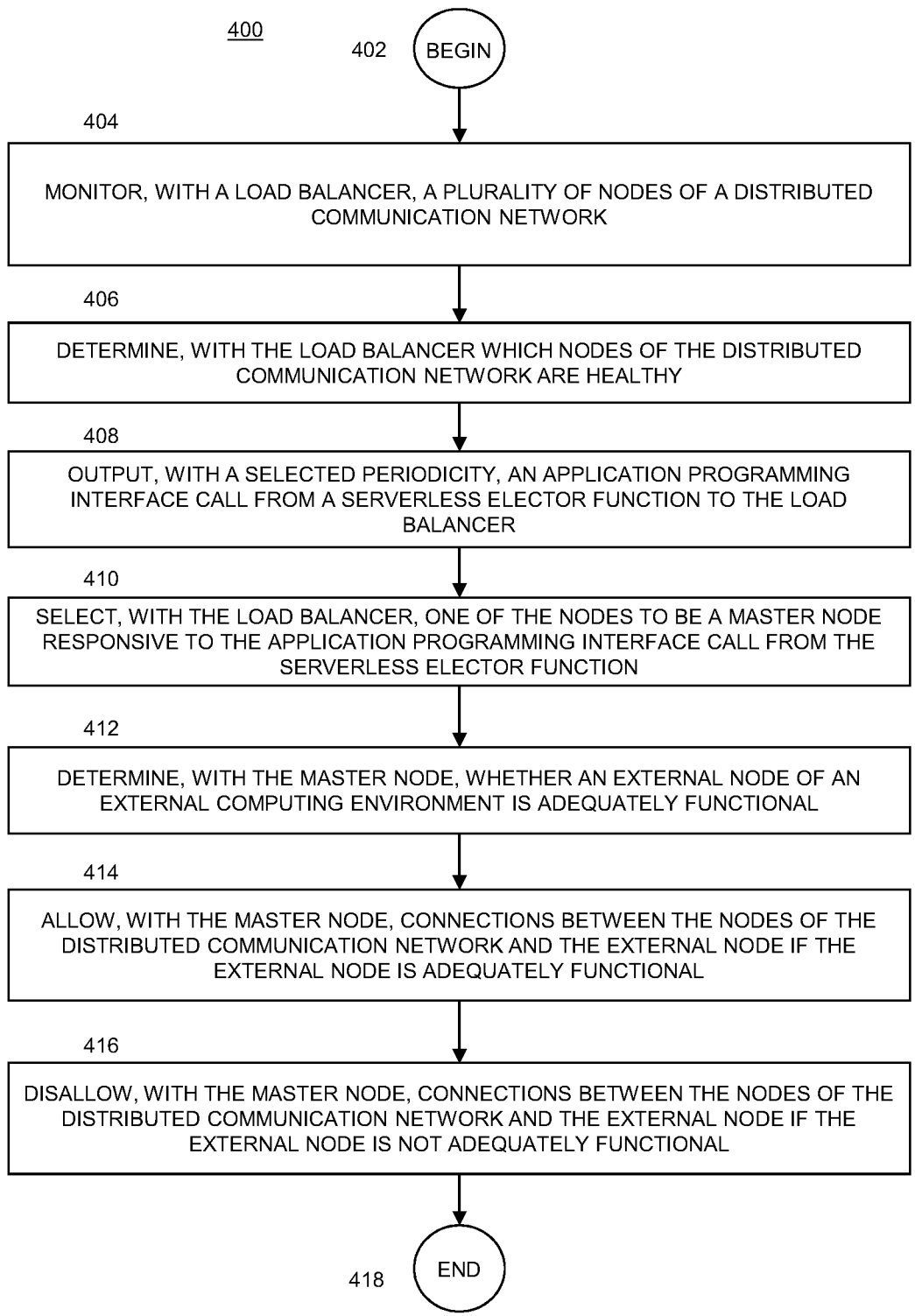
FIG. 4 is a flow diagram of a process for efficiently electing a master node from a plurality of candidate nodes, in accordance with one embodiment.

FIG. 4 illustrates a flow diagram of a process 400 for efficiently electing a master node from a plurality of candidate nodes, according to various embodiments.

Referring to FIG. 4, FIGS. 1-2, and the description of FIGS. 1-2 above, in one embodiment, process 400 begins at BEGIN 402 and process flow proceeds to MONITOR, WITH A LOAD BALANCER, A PLURALITY OF NODES OF A DISTRIBUTED COMMUNICATION NETWORK 404.

In one embodiment, at MONITOR, WITH A LOAD BALANCER, A PLURALITY OF NODES OF A DISTRIBUTED COMMUNICATION NETWORK 404, a plurality of nodes of a distributed communication network is monitored with a load balancer, using any of the methods, processes, and procedures discussed above with respect to FIGS. 1-2.

In one embodiment, once a plurality of nodes of a distributed communication network is monitored with a load balancer at MONITOR, WITH A LOAD BALANCER, A PLURALITY OF NODES OF A DISTRIBUTED COMMUNICATION NETWORK 404 process flow proceeds to DETERMINE, WITH THE LOAD BALANCER WHICH NODES OF THE DISTRIBUTED COMMUNICATION NETWORK ARE HEALTHY 406.

In one embodiment, at DETERMINE, WITH THE LOAD BALANCER WHICH NODES OF THE DISTRIBUTED COMMUNICATION NETWORK ARE HEALTHY 406, it is determined, with the load balancer which nodes of the distributed communication network are healthy, using any of the methods, processes, and procedures discussed above with respect to FIGS. 1-2.

In one embodiment, once it is determined, with the load balancer which nodes of the distributed communication network are healthy at DETERMINE, WITH THE LOAD BALANCER WHICH NODES OF THE DISTRIBUTED COMMUNICATION NETWORK ARE HEALTHY 406, process flow proceeds to OUTPUT, WITH A SELECTED PERIODICITY, AN APPLICATION PROGRAMMING INTERFACE CALL FROM A SERVERLESS ELECTOR FUNCTION TO THE LOAD BALANCER 408.

In one embodiment, at OUTPUT, WITH A SELECTED PERIODICITY, AN APPLICATION PROGRAMMING INTERFACE CALL FROM A SERVERLESS ELECTOR FUNCTION TO THE LOAD BALANCER 408, an application programming interface call is output with a selected periodicity from a serverless elector function to the load balancer, using any of the methods, processes, and procedures discussed above with respect to FIGS. 1-2.

In one embodiment, once an application programming interface call is output with a selected periodicity from a serverless elector function to the load balancer at OUTPUT, WITH A SELECTED PERIODICITY, AN APPLICATION PROGRAMMING INTERFACE CALL FROM A SERVERLESS ELECTOR FUNCTION TO THE LOAD BALANCER 408, process flow proceeds to SELECT, WITH THE LOAD BALANCER, ONE OF THE NODES TO BE A MASTER NODE RESPONSIVE TO THE APPLICATION PROGRAMMING INTERFACE CALL FROM THE SERVERLESS ELECTOR FUNCTION 410.

In one embodiment, at SELECT, WITH THE LOAD BALANCER, ONE OF THE NODES TO BE A MASTER NODE RESPONSIVE TO THE APPLICATION PROGRAMMING INTERFACE CALL FROM THE SERVERLESS ELECTOR FUNCTION 410, one of the nodes is selected, with the load balancer, to be a master node responsive to the application programming interface call from the serverless elector function, using any of the methods, processes, and procedures discussed above with respect to FIGS. 1-2.

In one embodiment, once one of the nodes is selected, with the load balancer, to be a master node responsive to the application programming interface call from the serverless elector function at SELECT, WITH THE LOAD BALANCER, ONE OF THE NODES TO BE A MASTER NODE RESPONSIVE TO THE APPLICATION PROGRAMMING INTERFACE CALL FROM THE SERVERLESS ELECTOR FUNCTION 410, process flow proceeds to DETERMINE, WITH THE MASTER NODE, WHETHER AN EXTERNAL NODE OF AN EXTERNAL COMPUTING ENVIRONMENT IS ADEQUATELY FUNCTIONAL 412.

In one embodiment, at DETERMINE, WITH THE MASTER NODE, WHETHER AN EXTERNAL NODE OF AN EXTERNAL COMPUTING ENVIRONMENT IS ADEQUATELY FUNCTIONAL 412, it is determined, with the master node, whether an external node of an external computing environment is adequately functional, using any of the methods, processes, and procedures discussed above with respect to FIGS. 1-2.

In one embodiment, once it is determined, with the master node, whether an external node of an external computing environment is adequately functional at DETERMINE, WITH THE MASTER NODE, WHETHER AN EXTERNAL NODE OF AN EXTERNAL COMPUTING ENVIRONMENT IS ADEQUATELY FUNCTIONAL 412, process flow proceeds ALLOW, WITH THE MASTER NODE, CONNECTIONS BETWEEN THE NODES OF THE DISTRIBUTED COMMUNICATION NETWORK AND THE EXTERNAL NODE IF THE EXTERNAL NODE IS ADEQUATELY FUNCTIONAL 414.

In one embodiment, at ALLOW, WITH THE MASTER NODE, CONNECTIONS BETWEEN THE NODES OF THE DISTRIBUTED COMMUNICATION NETWORK AND THE EXTERNAL NODE IF THE EXTERNAL NODE IS ADEQUATELY FUNCTIONAL 414, connections are allowed, with the master node, between the nodes of the distributed communication network and the external node if the external node is adequately functional, using any of the methods, processes, and procedures discussed above with respect to FIGS. 1-2.

In one embodiment, once connections are allowed, with the master node, between the nodes of the distributed communication network and the external node if the external node is adequately functional, at ALLOW, WITH THE MASTER NODE, CONNECTIONS BETWEEN THE NODES OF THE DISTRIBUTED COMMUNICATION NETWORK AND THE EXTERNAL NODE IF THE EXTERNAL NODE IS ADEQUATELY FUNCTIONAL 414, process flow proceeds to DISALLOW, WITH THE MASTER NODE, CONNECTIONS BETWEEN THE NODES OF THE DISTRIBUTED COMMUNICATION NETWORK AND THE EXTERNAL NODE IF THE EXTERNAL NODE IS NOT ADEQUATELY FUNCTIONAL 416.

In one embodiment, at DISALLOW, WITH THE MASTER NODE, CONNECTIONS BETWEEN THE NODES OF THE DISTRIBUTED COMMUNICATION NETWORK AND THE EXTERNAL NODE IF THE EXTERNAL NODE IS NOT ADEQUATELY FUNCTIONAL 416, connections are disallowed, with the master node, between the nodes of the distributed communication network and the external node if the external node is not adequately functional, using any of the methods, processes, and procedures discussed above with respect to FIGS. 1-2.

In one embodiment, once connections are disallowed, with the master node, between the nodes of the distributed communication network and the external node if the external node is not adequately functional, at DISALLOW, WITH THE MASTER NODE, CONNECTIONS BETWEEN THE NODES OF THE DISTRIBUTED COMMUNICATION NETWORK AND THE EXTERNAL NODE IF THE EXTERNAL NODE IS NOT ADEQUATELY FUNCTIONAL 416, process flow proceeds to END 418.

In one embodiment, at END 418 the process for efficiently electing a master node from a plurality of candidate nodes is exited to await new data and/or instructions.

As noted above, the specific illustrative examples discussed above are but illustrative examples of implementations of embodiments of the method or process for efficiently electing a master node from a plurality of candidate nodes. Those of skill in the art will readily recognize that other implementations and embodiments are possible. Therefore, the discussion above should not be construed as a limitation on the claims provided below.

In one embodiment, a computing system implemented method efficiently elects a master node from a plurality of candidate nodes. The method includes operating a plurality of nodes configured to connect to external nodes associated with external computing environments and to transmit and receive data from the external nodes associated with the external computing environments and managing the plurality of nodes with a load balancer. The method includes operating a serverless elector function implemented in accordance with a cloud computing infrastructure, monitoring the plurality of nodes with a cloud-based monitoring system, and outputting, from the monitoring system, a trigger signal to the serverless elector function with a selected periodicity. The method includes outputting, with the elector function in response to receiving the trigger signal, an application programming interface call to the load balancer and selecting, with the load balancer, one of the nodes to be a master node responsive to the application programming interface call from the serverless elector function.

In one embodiment, a system for efficiently electing a master node from a plurality of candidate nodes, the system includes at least one processor at least one memory coupled to the at least one processor. The at least one memory has stored therein instructions which, when executed by any set of the one or more processors, perform a process. The process includes operating a plurality of nodes configured to connect to external nodes associated with external computing environments and to transmit and receive data from the external nodes associated with the external computing environments and managing the plurality of nodes with a load balancer. The process includes operating a serverless elector function implemented in accordance with a cloud computing infrastructure, monitoring the plurality of nodes with a cloud-based monitoring system, and outputting, from the monitoring system, a trigger signal to the serverless elector function with a selected periodicity. The process includes outputting, with the elector function in response to receiving the trigger signal, an application programming interface call to the load balancer and selecting, with the load balancer, one of the nodes to be a master node responsive to the application programming interface call from the serverless elector function.

In one embodiment, a computing system implemented method stacks and launches applications utilizing base and extended patterns. The method includes monitoring, with a load balancer, a plurality of nodes of a distributed communication network and determining, with the load balancer which nodes of the distributed communication network are healthy. The method includes outputting, with a selected periodicity, an application programming interface call from a serverless elector function to the load balancer and selecting, with the load balancer, one of the nodes to be a master node responsive to the application programming interface call from the serverless elector function. The method includes determining, with the master node, whether an external node of an external computing environment is adequately functional, allowing, with the master node, connections between the nodes of the distributed communication network and the external node if the external node is adequately functional, and disallowing, with the master node, connections between the nodes of the distributed communication network and the external node if the external node is not adequately functional.

In one embodiment, a system for efficiently electing a master node from a plurality of candidate nodes, the system includes at least one processor at least one memory coupled to the at least one processor. The at least one memory has stored therein instructions which, when executed by any set of the one or more processors, perform a process. The process includes monitoring, with a load balancer, a plurality of nodes of a distributed communication network and determining, with the load balancer which nodes of the distributed communication network are healthy. The process includes outputting, with a selected periodicity, an application programming interface call from a serverless elector function to the load balancer and selecting, with the load balancer, one of the nodes to be a master node responsive to the application programming interface call from the serverless elector function. The process includes determining, with the master node, whether an external node of an external computing environment is adequately functional, allowing, with the master node, connections between the nodes of the distributed communication network and the external node if the external node is adequately functional, and disallowing, with the master node, connections between the nodes of the distributed communication network and the external node if the external node is not adequately functional.

Using the disclosed embodiments of a method and system for efficiently electing a master node from a plurality of candidate nodes, a method and system for efficiently electing a master node from a plurality of candidate nodes more accurately is provided. Therefore, the disclosed embodiments provide a technical solution to the long standing technical problem of providing a single master system that is reliable, efficient, inexpensive, and scalable.

The disclosed embodiments of a method and system for efficiently electing a master node from a plurality of candidate nodes are also capable of dynamically adapting to constantly changing fields such as data managements systems. Consequently, the disclosed embodiments of a method and system for efficiently electing a master node from a plurality of candidate nodes also provide a technical solution to the long standing technical problem of static and inflexible data management systems.

The result is a much more accurate, adaptable, and robust method and system for efficiently electing a master node from a plurality of candidate nodes. This, in turn, results in: less human and processor resources being dedicated to managing nodes, i.e., usage of fewer processing resources, usage of fewer memory storage assets, and less communication bandwidth being utilized to transmit data for analysis.

The disclosed method and system for efficiently electing a master node from a plurality of candidate nodes does not encompass, embody, or preclude other forms of innovation in the area of complex software application development and integration. In addition, the disclosed method and system for efficiently electing a master node from a plurality of candidate nodes is not related to any fundamental economic practice, fundamental data processing practice, mental steps, or pen and paper-based solutions, and is, in fact, directed to providing solutions to new and existing problems associated with complex software development environments. Consequently, the disclosed method and system for efficiently electing a master node from a plurality of candidate nodes, does not encompass, and is not merely, an abstract idea or concept.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid-state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for electing a master node from a plurality of candidate nodes, the method comprising:

operating a plurality of nodes configured to connect to external nodes associated with external computing environments and to transmit and receive data from the external nodes associated with the external computing environments;

managing the plurality of nodes with a load balancer;

operating a serverless elector function implemented in accordance with a cloud computing infrastructure;

monitoring the plurality of nodes with a cloud-based monitoring system;

outputting, from the monitoring system, a trigger signal to the serverless elector function with a selected periodicity;

outputting, with the serverless elector function in response to receiving the trigger signal, an application programming interface call to the load balancer; and selecting, with the load balancer, one of the nodes to be a master node responsive to the application programming interface call from the serverless elector function.

2. The method of claim 1, wherein the nodes each include one or more of:
a server;
a virtual machine;
an application executed by a virtual machine; and
an application executed by a physical machine.

3. The method of claim 1, wherein the serverless elector function is implemented in an Amazon Web Services cloud computing infrastructure.

4. The method of claim 3, wherein the serverless elector function is a lambda function.

5. The method of claim 1, wherein the load balancer is an elastic load balancer.

6. The method of claim 1, relinquishing, with the master node, master node status at the end of a period defined by the periodicity.

7. The method of claim 1, further comprising:
determining, with the monitoring system, that the master node is in a fault state;
outputting the trigger signal to the serverless elector function responsive to determining that the master node is in a fault state regardless of the selected periodicity;
making, with the serverless elector function, the application programming interface call to the load balancer responsive to receiving the trigger signal from the monitoring system; and
electing a new master node from the plurality of nodes responsive to the application programming interface call.

8. The method of claim 1, further comprising:
performing, with the load balancer, health checks on the nodes; and
electing a master node only from a group of nodes determined to be healthy based on the health checks.

9. The method of claim 1, wherein the application programming interface call is a representational state transfer application programming interface call.

10. The method of claim 1, wherein the periodicity is less than or equal to one hour.

11. The method of claim 1, wherein the periodicity is less than or equal to one minute.

12. The method of claim 1, wherein the master node is the only node allowed to make selected decisions for the operation of all the nodes.

13. The method of claim 12, further comprising determining, with the master node, whether the external nodes are healthy.

14. The method of claim 13, further comprising allowing or disallowing, with the master node, the nodes to connect to the external nodes based on whether the external nodes are healthy.

15. The method of claim 1, wherein selecting one of the nodes to be a master node includes passing the application programming interface call to a node selected by the load balancer.

16. A system for electing a master node from a plurality of candidate nodes, the system comprising:
at least one processor; and
at least one memory coupled to the at least one processor, the at least one memory having stored therein instructions which, when executed by the at least one processor, perform a process including:
operating a plurality of nodes configured to connect to external nodes associated with external computing environments and to transmit and receive data from the external nodes associated with the external computing environments;
managing the plurality of nodes with a load balancer;
operating a serverless elector function implemented in accordance with a cloud computing infrastructure;
monitoring the plurality of nodes with a cloud-based monitoring system;
outputting, from the monitoring system, a trigger signal to the serverless elector function with a selected periodicity;
outputting, with the serverless elector function in response to receiving the trigger signal, an application programming interface call to the load balancer; and
selecting, with the load balancer, one of the nodes to be a master node responsive to the application programming interface call from the serverless elector function.

17. The system of claim 16, wherein the nodes each include one or more of:
a server;
a virtual machine;
an application executed by a virtual machine; or
an application executed by a physical machine.

18. The system of claim 16, wherein the serverless elector function is implemented in an Amazon Web Services cloud computing infrastructure.

19. The system of claim 18, wherein the serverless elector function is a lambda function.

20. The system of claim 16, wherein the load balancer is an elastic load balancer.

21. The system of claim 16, further comprising relinquishing,
with the master node, master node status at the end of a period defined by the periodicity.

22. The system of claim 16, further comprising:
determining, with the monitoring system, that the master node is in a fault state;
outputting the trigger signal to the serverless elector function responsive to determining that the master node is in a fault state regardless of the selected periodicity;
making, with the serverless elector function, the application programming interface call to the load balancer responsive to receiving the trigger signal from the monitoring system; and
electing a new master node from the plurality of nodes responsive to the application programming interface call.

23. The system of claim 16, wherein the process further includes:
performing, with the load balancer, health checks on the nodes; and
electing a master node only from a group of nodes determined to be healthy based on the health checks.

24. The system of claim 16, wherein the application programming interface call is a representational state transfer application programming interface call.

25. The system of claim 16, wherein the periodicity is less than or equal to one hour.

26. The system of claim 16, wherein the periodicity is less than or equal to one minute.

27. The system of claim 16, wherein the master node is the only node allowed to make selected decisions for the operation of all the nodes.

28. The system of claim 27, wherein the process further includes determining, with the master node, whether the external nodes are healthy.

29. The system of claim 28, wherein the process further includes allowing or disallowing, with the master node, the nodes to connect to the external nodes based on whether the external nodes are healthy.

30. The system of claim 16, wherein selecting one of the nodes to be a master node includes passing the application programming interface call to a node selected by the load balancer.

31. A method for electing a master node from a plurality of candidate nodes, the method comprising:
   monitoring, with a load balancer, a plurality of nodes of a distributed communication network;
   determining, with the load balancer, which nodes of the distributed communication network are healthy;
   outputting, with a selected periodicity, an application programming interface call from a serverless elector function to the load balancer;
   selecting, with the load balancer, one of the nodes to be a master node responsive to the application programming interface call from the serverless elector function;
   determining, with the master node, whether an external node of an external computing environment is adequately functional;
   allowing, with the master node, connections between the nodes of the distributed communication network and the external node if the external node is adequately functional; and
   disallowing, with the master node, connections between the nodes of the distributed communication network and the external node if the external node is not adequately functional.

32. The method of claim 31, wherein the serverless elector function is implemented in accordance with one or more of:
   an amazon web service (AWS) cloud computing environment;
   a Microsoft Azure cloud computing environment; or
   a Google Cloud computing environment.

* * * * *